(12) United States Patent
Pierce et al.

(10) Patent No.: US 7,174,554 B2
(45) Date of Patent: Feb. 6, 2007

(54) TOOLS AND METHODS FOR DISCOVERING RACE CONDITION ERRORS

(75) Inventors: Kenneth Bryant Pierce, Sammamish, WA (US); Ho-Yuen Chau, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 10/326,772

(22) Filed: Dec. 20, 2002

(65) Prior Publication Data

US 2004/0123185 A1 Jun. 24, 2004

(51) Int. Cl.
*G06F 9/44* (2006.01)
*G06F 9/30* (2006.01)
*G06F 11/26* (2006.01)

(52) U.S. Cl. .................. 718/107; 714/25; 712/227; 712/228; 710/260; 710/262; 710/266; 702/119; 717/124

(58) Field of Classification Search .................. 718/1, 718/100–108; 719/310–332; 712/1–300; 714/1–824; 710/1–317; 717/100–178
See application file for complete search history.

(56) References Cited

U.S. PATENT DOCUMENTS

| | | | | |
|---|---|---|---|---|
| 5,515,538 A * | 5/1996 | Kleiman | .................. | 710/260 |
| 5,682,554 A * | 10/1997 | Harrell | .................. | 710/57 |
| 5,835,705 A * | 11/1998 | Larsen et al. | .................. | 714/47 |
| 6,018,759 A * | 1/2000 | Doing et al. | .................. | 718/108 |
| 6,052,708 A * | 4/2000 | Flynn et al. | .................. | 718/108 |
| 6,256,775 B1 * | 7/2001 | Flynn | .................. | 717/127 |
| 6,341,347 B1 * | 1/2002 | Joy et al. | .................. | 712/228 |
| 6,370,606 B1 * | 4/2002 | Bonola | .................. | 710/260 |
| 6,418,542 B1 * | 7/2002 | Yeager | .................. | 714/38 |
| 6,748,556 B1 * | 6/2004 | Storino et al. | .................. | 714/42 |
| 6,957,432 B2 * | 10/2005 | Ballantyne | .................. | 718/100 |
| 2001/0034751 A1 * | 10/2001 | Eto et al. | .................. | 709/100 |
| 2002/0078121 A1 * | 6/2002 | Ballantyne | .................. | 709/102 |
| 2005/0229178 A1 * | 10/2005 | Ballantyne | .................. | 718/100 |
| 2005/0229179 A1 * | 10/2005 | Ballantyne | .................. | 718/100 |

OTHER PUBLICATIONS

Gergeleit, Martin et al. "JewelNT: Monitoring of Distributed Real-time Applications on Windows NT." Oct. 1999.*
Stefan Savage, Michael Burrows, Greg Nelson, Patrick Sobalvarro and Thomas Anderson, "Eraser: A Dynamic Data Race Detector for Multithreaded Programs", *ACM*, Proceedings of the sixteenth ACM symposium on Operating systems principles, Oct. 1997, vol. 31, No. 5, pp. 27-37.

(Continued)

*Primary Examiner*—Lewis A. Bullock, Jr.
(74) *Attorney, Agent, or Firm*—Klarquist Sparkman, LLP

(57) ABSTRACT

Tools and methods are described herein for discovering race condition errors in a software program. The errors are discovered by deliberately causing a processor executing the test program to switch threads at intervals other than normally scheduled by an operating system. The thread switching is caused upon occurrence of selected events. The intervals may be selected automatically or with user input. Furthermore, thread switching may be caused during conditions more likely to cause race condition errors. For example, thread switches may be caused between threads that share control of a memory device or while the processor is executing instructions related to synchronization tools (e.g. locks, mutex, etc.).

24 Claims, 9 Drawing Sheets

OTHER PUBLICATIONS

Stefan Savage, Michael Burrows, Greg Nelson, Patrick Sobalvarro and Thomas Anderson, "Eraser: A Dynamic Data Race Detector for Multithreaded Programs", *ACM*, Transactions on Computer Systems (TOCS), Nov. 1997, vol. 15, No. 4, pp. 391-411.

Eli Poznianasky and Asaf Schuster, "Efficient On-the-Fly Data Race Detection in Multithreaded C++ Programs", *ACM*, Proceedings of the ninth ACM SIGPLAN symposium on principles and practice of parallel programming, Jun. 2003, vol. 38, Issue 10, pp. 179-190.

Robert O'Callahan and Jong-Deok Choi, "Hybrid Dynamic Data Race Detection", *ACM*, Proceedings of the ninth ACM SIGPLAN symposium on principles and practice of parallel programming, Jun. 2003, vol. 38, Issue 10, pp. 167-178.

Cormac Flanagan and Stephen N. Freund, "Type-Based Race Detection for Java", *ACM*, Proceedings of the ACM SIGPLAN 2000 conference on Programming language design and implementation, May 2000, vol. 35, Issue 5, pp. 219-232.

Michiel Ronsse and Koen De Bosschere, "RecPlay: A Fully Integrated Practical Record/Replay System", *ACM* Transactions on Computer Systems (TOCS), May 1999, vol. 17, No. 2, pp. 133-152.

\* cited by examiner

FIG. 8

```
VOID
GenericHandler() {
    Save state (pushad,cld)
    Switch ON Interrupt type
        Case PerfCounterOverflow:
            Get random number;
            Reset Perfcounter
            If (Active Process is process to shake) then
                Change the IRET value to return to Shake()
        Case BoundsCheck:
            Restore state saved on previous perfcounter Overflow;

IRETD
}
```

FIG. 9

```
//Ebp is expected to be a CONTEXT_ index
int boundscheck[2] = {2,0};
void __declspec(naked) ReturnFromSample()
{
    __asm lock dec global.NumberOfThreadsInside // decrement thread count
    __asm bound eax,boundscheck  //always fails //Re-enter R0 restore original state
    __asm int 3;  //We should never get here.
    __asm ret; //make compiler happy.  We should never get here.
}
void DoShake(PUSHAD_CONTEXT* pContext) {
global.NtYieldExecution();
}
void _declspec(naked) Shake()
{
    __asm
    {
        cld;
        pushad
        mov eax,esp
        push eax
        call DoShake;
        popad
        call ReturnFromSample    // returns to original state.
        int 3
        ret
    }
}
```

TOOLS AND METHODS FOR DISCOVERING RACE CONDITION ERRORS

TECHNICAL FIELD

The technical field relates to tools for testing the reliability of software programs having multithreading capabilities.

BACKGROUND

Multithreading has become a mainstream programming technique for improving processing speed by optimizing the shared use of system resources by multiple processes. Multithreading allows the operating system to manage the use of a software program by more than one user at time or for serving more than one request by a single user. Each user request is kept track of as a thread with a separate identity. At any given time multiple requests may be kept in a queue. While processing a particular thread, the resource processing the thread may have to wait for completion of certain events (e.g. processing of an I/O operation such as reading and writing to a printer). During such waiting periods, multithreading capability allows the operating system to switch from processing one thread to another thread that is ready for processing (this is also known as thread context switching). Thus, the operating system can more efficiently manage the use of system resources. But interactions between threads can significantly complicate the software development process.

Although an operating system can allow concurrent use of a particular resource by two different threads, sometimes such concurrent uses can lead to errors referred to as race conditions. For example, if two threads of a multithreaded process are allowed to access a memory location and at least one of the accesses is for a write operation, a race condition is created because the result of the operation depends upon which thread executes the memory access first. Race conditions can cause serious errors in programs such as, security violations, data corruption and crashes.

Several programming techniques are used to manage the use of multiple threads (e.g. using, locks, mutexes, critical sections, event objects etc.). These are also commonly referred to as synchronization techniques. Even with the use of such techniques, race conditions may continue to occur due to errors in implementing these tools such as, missing or incorrect use of synchronization objects.

Furthermore, errors that can lead to race conditions are notoriously difficult to detect during a normal testing period. Although race conditions are more likely to occur due to thread context switches, such switches do not occur often enough to cause race condition errors during a normal testing period. Thus, the mean-time-to-failure of a multithreaded program due to a race condition between threads is particularly long. This means that a program can be tested a large number of times without a race condition ever occurring during the testing process. However, the bug may occur once the program is released to the market.

Thus, there is a need for a software testing tool that allows a developer to deliberately switch threads to cause race condition errors within a normal testing period, and is easily adaptable to be used with any given test case.

SUMMARY

As described herein, methods and tools are provided for testing a software program to discover errors that could cause race conditions. The tools and methods discover race condition errors by deliberately causing processors to switch between processing various threads more often than the normally scheduled switches.

In one aspect, a processor is interrupted while processing a thread related to a program being tested for race conditions. Upon interrupt, the processor is instructed to yield the interrupted thread's time slice to another thread ready for processing.

In another aspect, the processor is interrupted at selected intervals. The selected intervals may be measured in relation to processor related events such as, clock cycles, bus transactions, memory transactions, and branch transactions. In another aspect, the selected intervals for causing an interrupt may be user selected.

In one aspect, such intervals are tracked using a performance counter associated with the processor. Upon interrupt, the performance counters trigger the processor's interrupt descriptor table for the processors to receive a pointer to an interrupt handler function adapted to respond to the interrupt. The interrupt handler functions cause the processor to switch threads by calling a thread switch function associated with the program being tested. This process is repeated multiple times at various intervals to cause an abnormal number of thread switches. The intervals may be selected randomly to ensure all parts of a program are exposed to the testing.

In another aspect, the tool may be adapted to cause thread switches during windows when race conditions are more likely to occur. For example, causing thread switches between threads that share control of a memory element, and causing thread switches when the processor is executing instructions associated with a lock.

Additional features and advantages of the invention will be made apparent from the following detailed description that proceeds with reference to the accompanying drawings.

BRIEF DESCRIPTION OF DRAWINGS

FIG. 8 illustrates a programmatic description of an interrupt handler function corresponding in functionality to the interrupt handler of FIG. 7.

FIG. 9 illustrates a programmatic description of one embodiment of a thread switch function to be called by the interrupt handler of FIG. 7.

DETAILED DESCRIPTION

In a software program having multithreading capability, thread context switching is used to shift control of a given resource between multiple threads belonging to multiple processes or programs. Such switching can improve utilization of system resources. However, generating thread context switches also slows down the processing speed to the extent the processor has to execute the few more instructions related to the switching. For example, the current state of the program being processed may have to be saved prior to a thread switch so that control to the suspended thread may be restored at the exact spot where the control was first yielded. Thus, developers are cautious in their use of thread context switching to improve system performance.

However, errors due to race conditions are more likely to occur due to thread context switching. Such errors can be catastrophic. But, typical programs do not cause thread context switches in sufficient numbers to effectively detect race conditions during a standard test period. Thus, for effectively testing the reliability of a software program more context switching than normal is desirable during testing. Therefore, it desirable to use a tool that can adapt a given program to deliberately cause thread context switching more often than as normally scheduled by the operating system of the program. The methods and tools described below can be used to easily adapt any given program to be tested for race condition errors.

Exemplary Tool for Discovering Race Condition Errors

Figure 1:
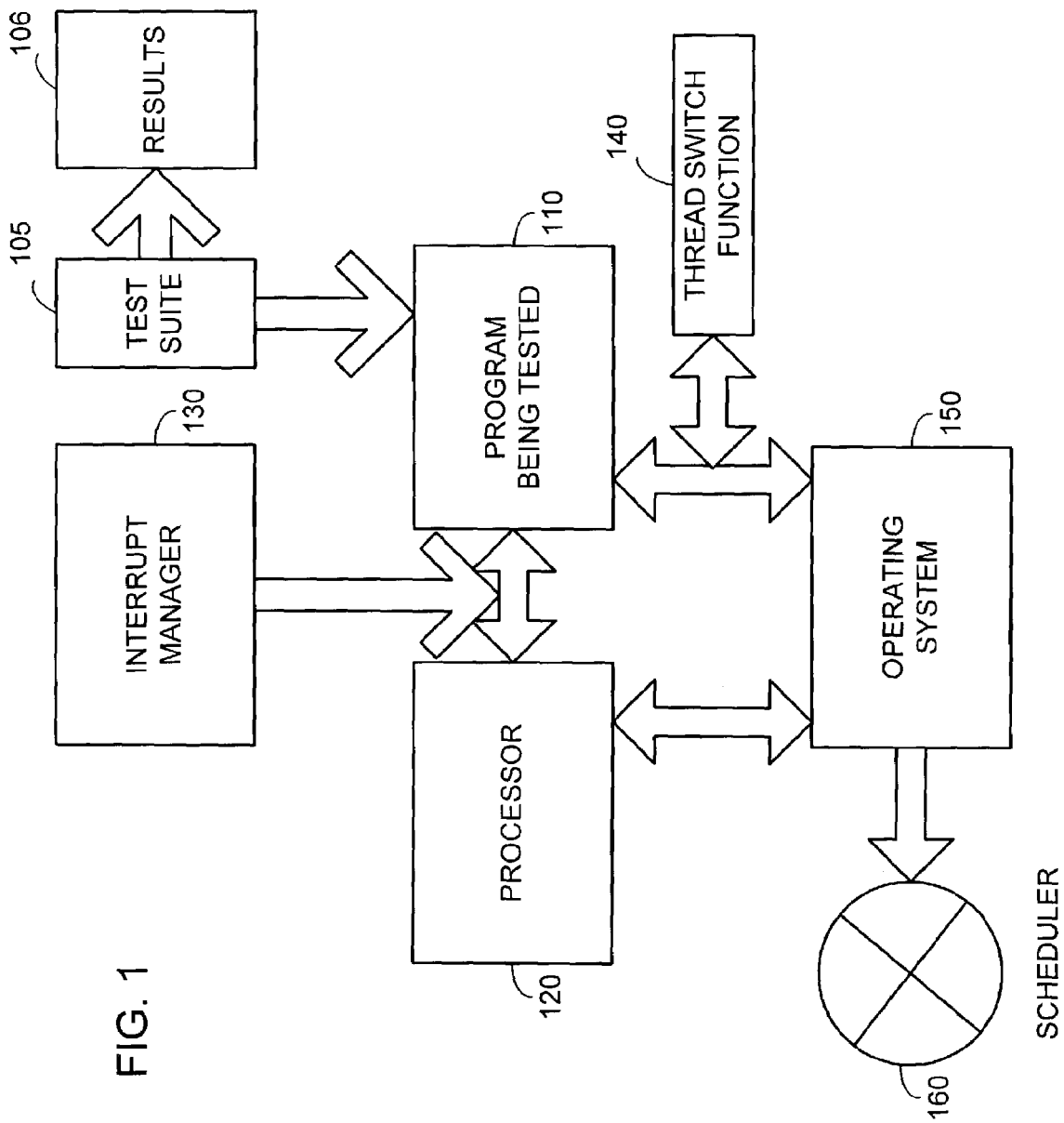
FIG. 1 is a block diagram illustrating the functioning of a tool for discovering race condition errors.

FIG. 1 illustrates the functionality of a tool used to test a program to discover errors that could cause race conditions by deliberately causing thread context switches more often than normally scheduled switches. The tool comprises an interrupt manager 130 that generates an interrupt during the processing of a program 110 on a processor 120. The interrupt manager 130 also provides instructions to the processor 120 on how to respond to such generated interrupts. The response includes calling a thread switch function 140, which causes the operating system 150 to switch the processor 120 from processing the interrupted thread to another thread ready to be processed according to the scheduler 160. A test suite 105 is provided to manage the testing process. If the tool causes thread switches often enough, race conditions will be detected in the results 106 seen by the test suite 105. Some race errors result in the complete shut down of a system. Other errors may result in less noticeable errors such as data corruption. The test suite 105 detects all such errors due to race conditions.

Exemplary Process for Discovering Race Conditions Errors

Figure 2:
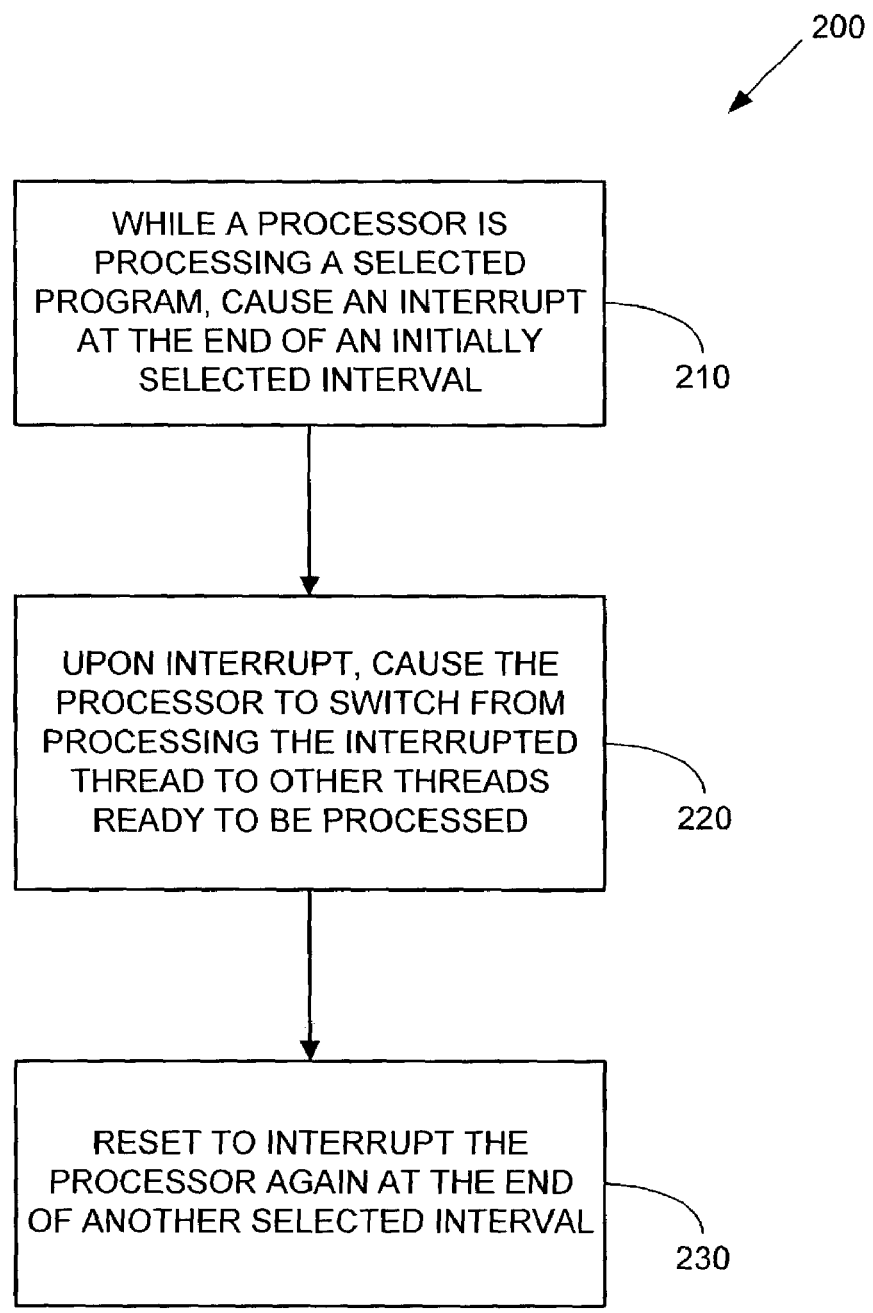
FIG. 2 is a flow chart illustrating an exemplary method for using the tool of FIG. 1 for discovering race condition errors.

FIG. 2 illustrates a method 200 for discovering race condition errors. At 210, the processor 120 of FIG. 1 is interrupted while processing a program 110. The interrupt manager 130 generates the interrupt at selected intervals or upon the processor 120 reaching any given condition. Upon interrupt at 220, the operating system 150 of FIG. 1 is instructed to cause the processor 120 to switch from processing interrupted thread to another thread ready to be processed according to the scheduler 160. Then at 230, the processor 120 is reset to cause another interrupt at the end of another selected interval. Thus, the process 200 is repeated multiple times to cause multiple thread context switches at various intervals to discover race condition errors. By carefully selecting intervals upon which interrupts are generated, the process 200 is used to generate a sufficient number of thread context switches so as to discover race condition errors within a typical test period. For example, thread context switching may be caused deliberately between two threads that share a memory resource.

The interrupted thread may be related to the program 110 being tested for race condition errors or other programs (not shown) related to system as whole. Thus at 220, the interrupt manager 130 may not initiate a thread context switch, if the interrupted thread is not related to the program 110 being tested. The process 200 may be used with a single processor 120 (as shown in FIG. 1) or even a network of multiple processors running multiple programs.

Exemplary Implementation of a Tool for Discovering Race Condition Errors

Figure 3:
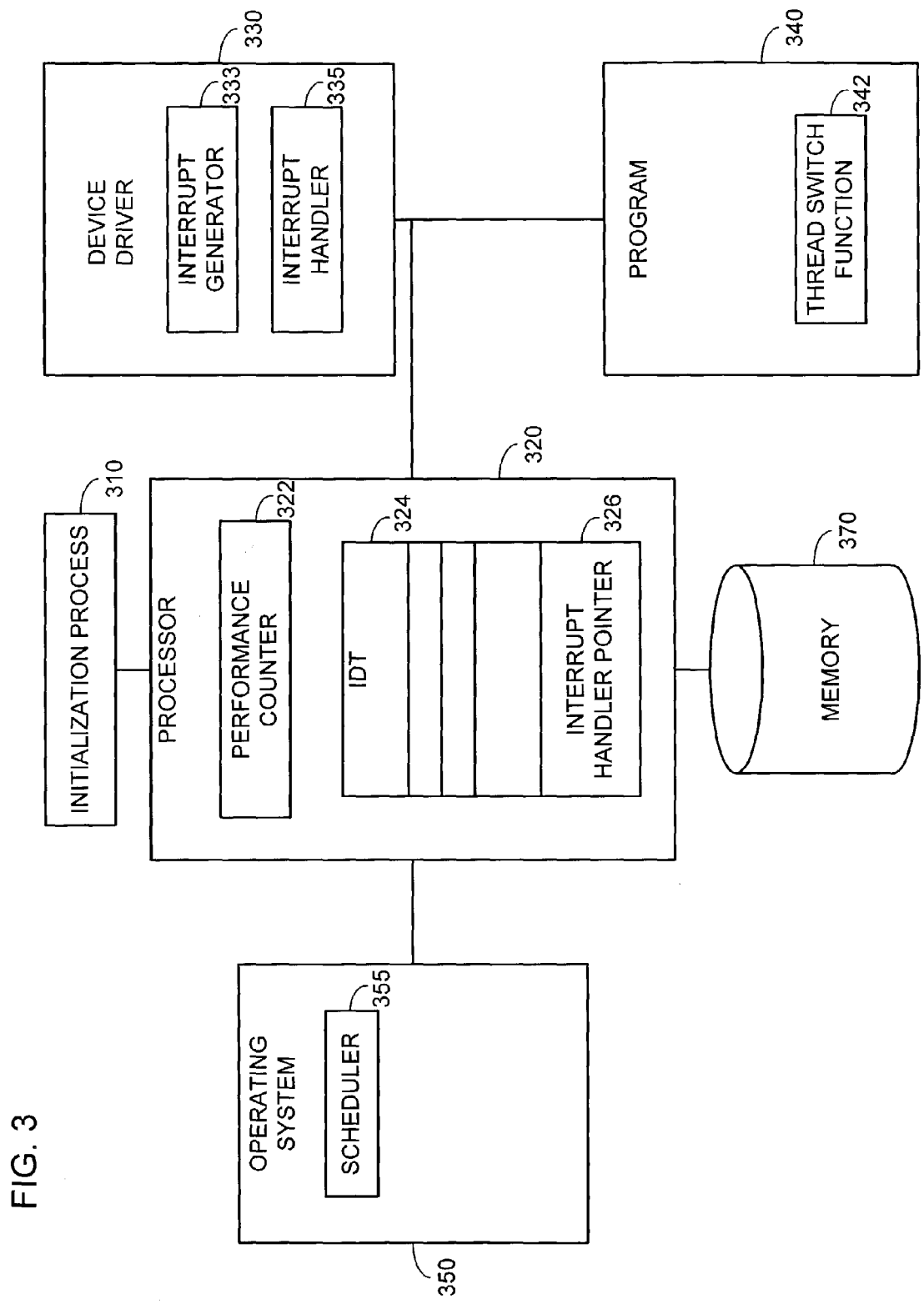
FIG. 3 is a block diagram illustrating a particular implementation of the tool described with reference to FIGS. 1 and 2.

The testing tool for race condition errors described with reference to FIGS. 1 and 2 may be implemented in a variety of ways. FIG. 3 illustrates the functioning of one such implementation operative for quickly and efficiently discovering race condition errors. The tool comprises an initialization process 310 that prepares the tool and the test subjects (e.g. the program 340 and the processor 320) for testing. The tool further comprises a device driver 330 (corresponding in functionality to the interrupt manager 130 of FIG. 1) that causes and responds to interrupts. The device driver is capable of causing interrupts at various intervals as measured by the occurrence of various events related to the processor 320 (e.g. number of clock cycles of a processor). The device driver 330 itself comprises an interrupt generator function 333 for causing interrupts and an interrupt handler function 335, which provides instructions for responding to the occurrence of such interrupts. One such response generated by the interrupt handler 335 may be to call the thread switch function 342, which causes the operating system 350 to suspend executing a current thread to switch to executing another thread ready to be executed in the scheduler 355.

Figure 4:
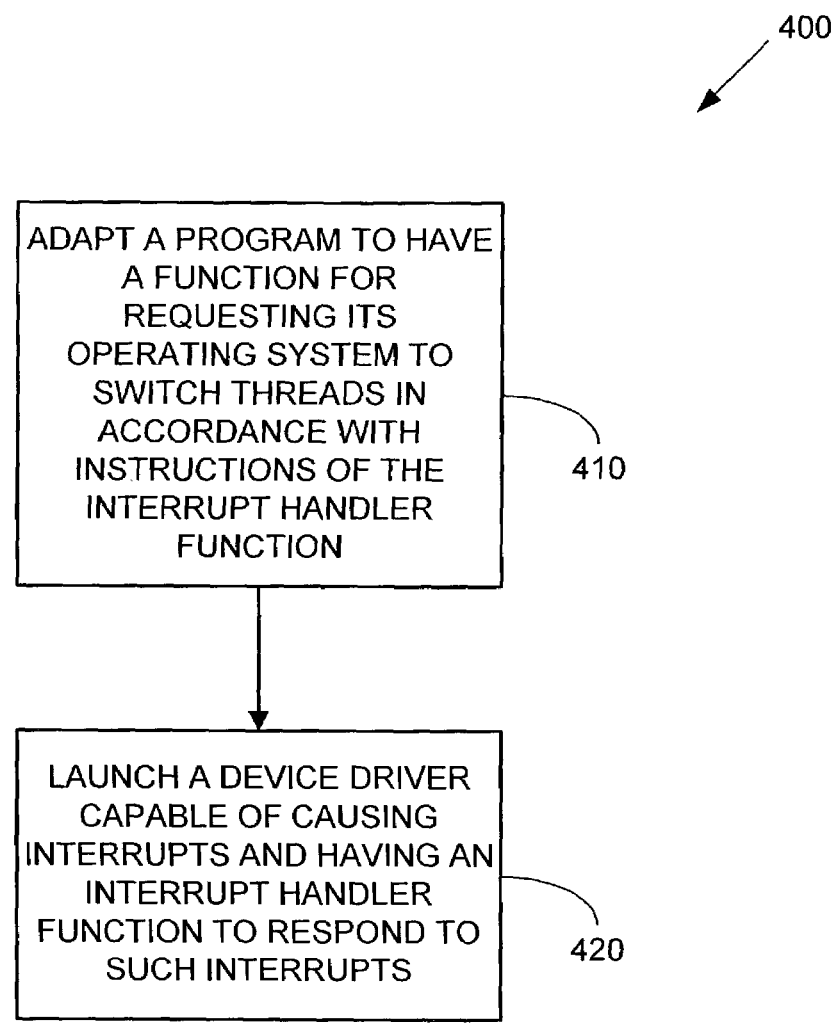
FIG. 4 is a flow chart illustrating an overall initialization process of the tool of FIG. 3 for preparing to test for race condition errors.

Exemplary Initialization Process for Preparing to Test a Program for Race Condition Errors FIG. 4 shows a description of the initialization process 310 of FIG. 3. The initialization process 400 is activated at the beginning of a test for race condition errors. During the initialization process 400, the test program 340 and the processor 320 processing it are prepared for testing. At 410, the initialization process 310 adapts the test program 340 to have a thread switching function 342. Then at 420, the initialization process 310 launches the device driver 330 of FIG. 3 to prepare to test for race conditions.

The initialization process 310 adapts the test program 340 by placing the thread switch function 342 within selected virtual address spaces related to the program. Thus, the test program 340 is not significantly altered to adapt it to test for race conditions and its performance is also not significantly altered from that of an actual program. Furthermore, the processing speed of the test program 340 is not slowed down significantly, allowing it to be tested for race conditions within normal test periods.

Figure 5:
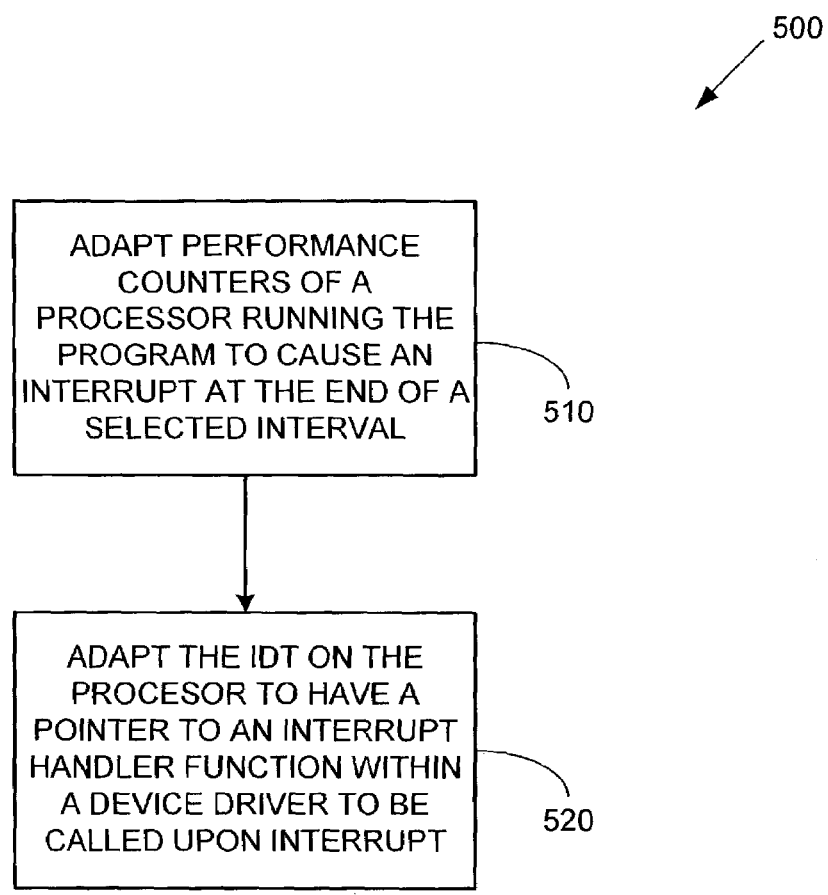
FIG. 5 is a flow chart describing the aspect of the initialization process related to preparing a program and a processor to test for race condition errors.
Figure 6:
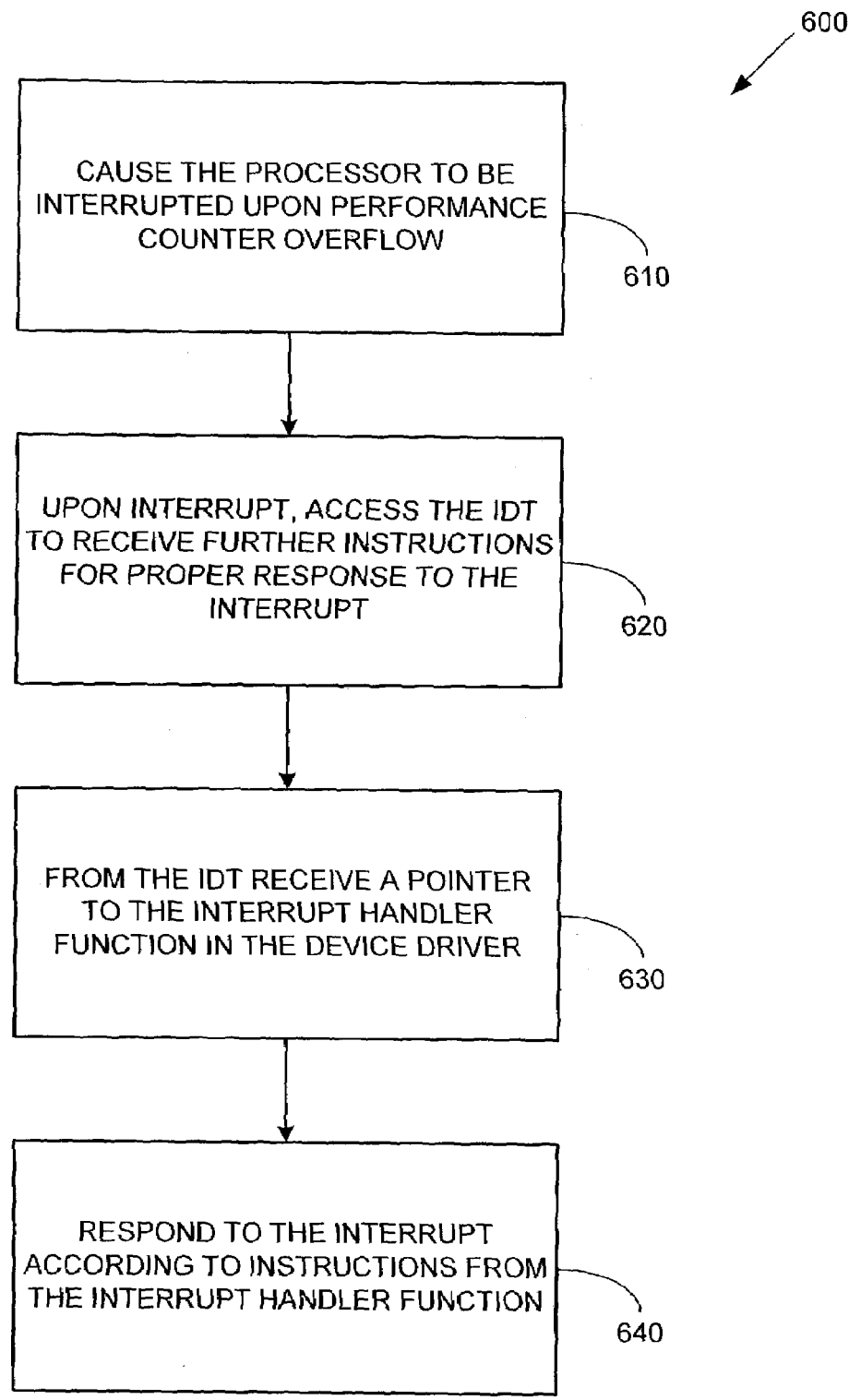
FIG. 6 is a flow chart describing a process for using a interrupt manager and a thread switch function to discover race condition errors.

Once the device driver 330 of FIG. 3 is launched at 420, the device driver completes process 500 of FIG. 5 to prepare testing for race conditions. At 510, the interrupt generator function 333 of the device driver 330 initially presets a performance counter 322 to generate an interrupt at the end of an initially selected interval. The performance counter 322 is reset later to generate interrupt at other intervals. Generally, several performance counters are provided within a processor (e.g. a Pentium® Xeon® processor has 18 such counters). Such counters are used to track occurrences of a number of different events related to the processor. For example, a common event to track is the number of clock cycles related to the processor. However, occurrences of other processor related events such as, the number of bus or memory transactions may also be tracked and counted. Thus, an interval upon which to cause an interrupt may be related to processor related events. Also, a variable besides time (clock cycles) may be used to randomly generate thread context switches.

The performance counter 322 is preset by the device driver to overflow upon the occurrence of a selected number of clock cycles. For example, that number may be 10,000 clock cycles, although, any number of clock cycles may be selected. The number of cycles for overflow preferably is not so short as to lead to overly frequent context switching thereby overly reducing the speed of processing the application. However, an excessively long period will cause context switching too infrequently and reduces the possibility of causing a race condition error.

Once the device driver 330 is launched, at 520, the Interrupt Descriptor Table (IDT) is adapted to contain a pointer 320 to the interrupt handler function 335. Thus, when the performance counter 322 overflows, the processor 320 is directed to call the interrupt handler function 335 via the pointer 326 in the IDT 324. IDT 324 is a table associated with the processor 320 and it is used to relate each interrupt received by the processor 320 to a procedure or task to be performed upon interrupt. For example, in an Intel® Pentium® processor the IDT 324 is an array of 256 entries for entering 8 byte descriptors. In such an array, the entries are labeled 0–255. Each of these values (0–255) corresponds to a unique interrupt vector value associated with each interrupt. Thus upon each interrupt, the processor is directed to the appropriate entry (0–255) in the IDT 324 to get further instructions. Usually, the first few entries in an IDT 324 are preset and relate to interrupts generated during normal operations of the processor 320. However, the device driver 330 uses one of the later table entries to contain a pointer to the interrupt handler function 335. The interrupt handler function 335 contains a set of procedures or tasks for the processor 320 to execute upon interrupt. The interrupt handler function 335 is described in more detail below.

Using a Tool having an Interrupt Generator and a Thread Switch Function for Discovering Race Condition Errors Once the test program 340 and the processor 320 are prepared by the initialization process 310 as described above, the testing for race condition errors may begin. At 610, the processor is interrupted when the performance counter overflows at the end of a chosen interval (e.g. counting a selected number of clock cycles). Upon interrupt at 620, the processor accesses the IDT 326 to get further instructions to respond to the interrupt. At 630, using an interrupt vector value related to the interrupt (provided by the device driver 330 of FIG. 3), the processor 320 is directed to the interrupt handler function by the pointer 326 stored in the IDT 326. At 640, the interrupt handler function 326 is called to respond to the interrupt.

Figure 7:
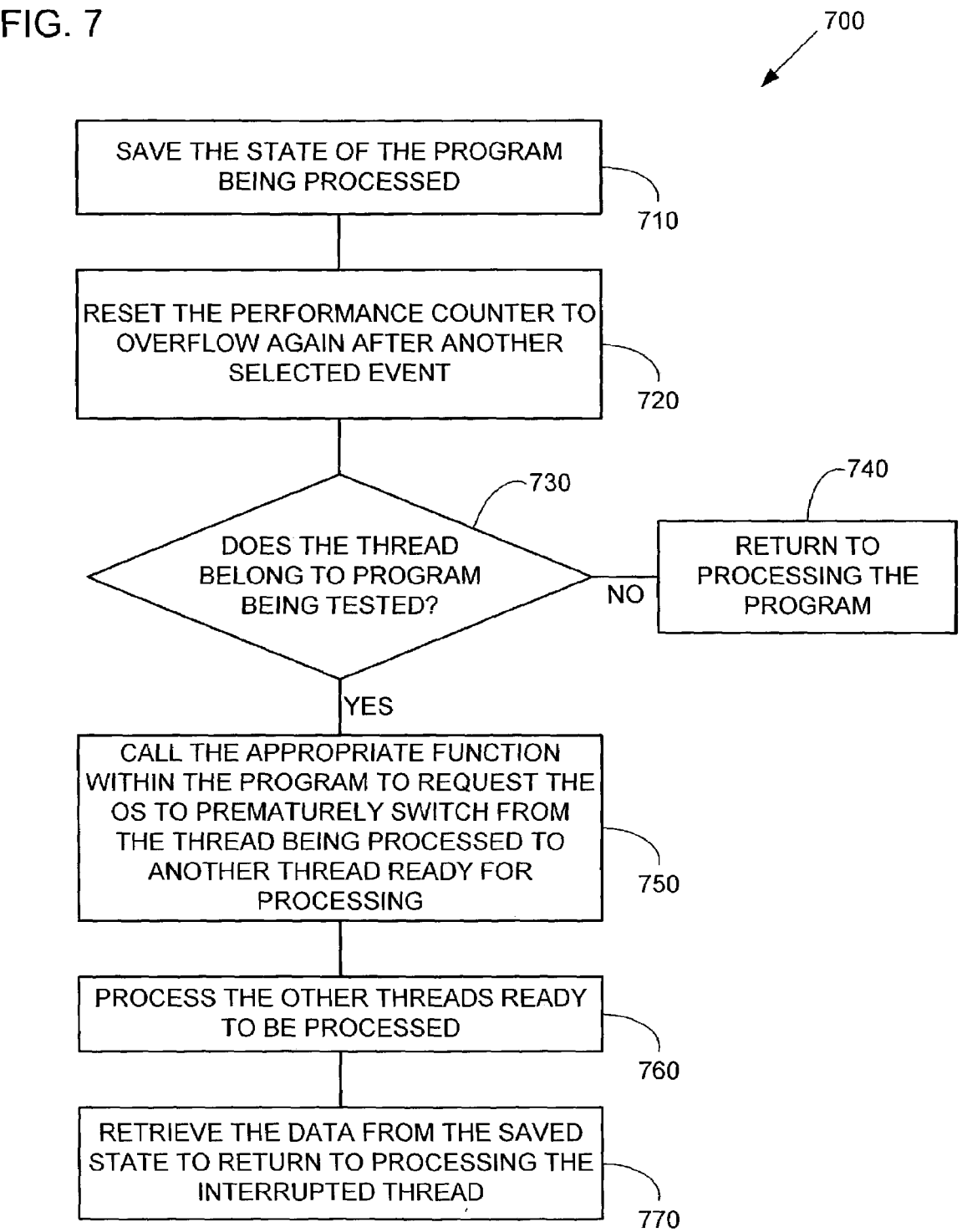
FIG. 7 is a flow chart describing a interrupt handler function to be called upon interrupt for discovering race condition errors.

Exemplary Interrupt Handler Function to be used for Discovering Race Condition Errors Interrupt handlers are special software routines or tasks which are called upon interrupt to instruct the processor on how to respond to the interrupt. Just as any software component these handler functions can themselves directly call other functions or provide pointers to other functions. The device driver 330 is specially adapted to have an interrupt handler function 336 that is functional for causing a stream of interrupts at various intervals. FIG. 7 describes one such interrupt handling function.

Once the processing of a current thread is stopped (process 610) and a interrupt handler function is called (process 630), at 710, the state of the program while processing the interrupted thread is stored in a memory device 370 of FIG. 3 to be retrieved later for restoring the program's state. Then at 720, the performance counter 322 is reset to generate another interrupt after another interval. This interval may be another randomly selected count of clock cycles or it may be related to other processor events (e.g. selected number of bus or memory transactions). It is desirable for the reset interval to be randomly selected such that the reset interval is not dependent on a previous interval selected by the device driver 330 either during the initialization process 310 or subsequently. This will increase the probability of different parts of the program's code being tested for race condition errors at each interrupt. For example, a Poisson random number generator function is particularly well suited for introducing randomness to the process of selecting the subsequent event upon which interrupts will be generated. Such a distribution is well suited because it does not rely on the properties of previous intervals for selecting subsequent intervals upon which interrupts will be generated.

Once the resetting of a performance counter is complete, at 730 an inquiry is made as to whether the program whose processing was interrupted is the test program 340 of FIG. 4 being tested for race condition errors. It is likely that during the testing process and in the real world environment, the program will be run along with other programs. However, in order to simplify the test and to focus the testing on the program at hand a thread switch is not attempted for interrupted threads that are not related to a test case. Instead at 740, the processor is returned to finish processing the interrupted thread.

However, if the thread is related to the test program 340 then at 750 the thread switch function 342 is called to instruct the operating system 350 to cause the processor 320 to yield the processing time allotted to the interrupted thread and switch to processing another thread ready to be processed. At 760, the processor 320 begins to process other threads. Such thread switching increases the chances that two different threads may be trying to access a shared resource in a manner inconsistent with its use (e.g. one thread may try to write to a memory location, whose control it is sharing with another thread trying to read from the same location). The process 700 causes multiple thread switches at various intervals because performance counters 322 are reset at 720 each time the interrupt handler function 335 is called. Thus, the probability of discovering race condition errors is increased by causing thread switches at intervals other than those scheduled by the operating system. Also, once a thread switch occurs from a interrupted thread to the next thread ready for processing, processing of the next thread too may be interrupted, depending upon the interval selected at 720.

The operating system 350 schedules the multiple threads according to some preset priorities that may differ according to operating systems and according to processors. The priorities are set and implemented using a scheduler 360 associated with the operating system. Most operating systems use a round robin format scheduler such as the scheduler 355 shown in FIG. 3. Thus, each thread is allocated a certain amount (time slice) of processing time for execution. However, when the execution of a thread is interrupted and a thread switch function 342 is called, the time slice of the interrupted thread is yielded to the next thread scheduled for execution. The processor will then come back to processing interrupted threads according to the priorities implemented in the scheduler 355. In that event, at 770, the processor 320 uses the previously stored state information to return to processing the interrupted thread.

Exemplary Programmatic Description of an Interrupt Handler Function

FIG. 8 shows a programmatic description of an interrupt handler function corresponding in functionality to the interrupt handler of FIG. 7.

Exemplary Thread Switch Function

Many operating systems support functions that cause an associated processor to interrupt processing a current thread and switch to another thread ready for processing. For example, Microsoft® Windows® operating systems (Windows® 98, Windows® NT 4.0, Windows® Millenium Edition, Windows® 2000, Windows® XP, and Windows® .NET Server family) support a Sleep (time span) function that is called to suspend processing of a current thread for the duration of the time span parameter. However, if the time span is set to be "0" then the function will cause the processor to suspend the current thread and switch to processing other threads waiting to be processed. Instead of specifying a "0" value for the time span, calling a Sleep( ) without a time span parameter will cause the same result.

Another alternative is to use a Switch To Thread function, which is also supported by some versions of the Microsoft® Windows® operating systems (Windows® NT 4.0, Windows® 2000 and Windows® XP). The Switch To Thread function also causes a current thread being processed to yield execution to another thread, if there are other threads waiting to be executed. The yield of execution is in effect for up to one time slice of thread scheduling (time required to execute all threads waiting to be executed). After that, the operating system reschedules execution of the yielding thread. Unlike the Sleep (Time Span) function, the SwitchToThread function does not use a parameter.

Alternatively, a thread switch function specially programmed to cause a processor to switch from processing a current thread to another thread ready for processing may be used. For example, FIG. 9 shows a programmatic description of such a function referred to as a NtYieldExecution function.

Although the functions, sleep( ), Switch To Thread, and Nt YieldExecution functions relate specifically to Microsoft® Windows® operating systems. Other operating systems (e.g. Linux, OS/400 etc.) that support multithreading may have other functions similar to those described above for causing thread switches.

Regardless of the particular function called to cause a thread switch, these functions cannot be called under certain specific conditions. Processors determine whether to react to an interrupt by considering a priority value referred to as an IRQL (interrupt request level). The processor may have a current IRQL such that any interrupts below the current IRQL value cannot interfere with current processing. In a typical processor adapted for running Microsoft® Windows® 2000 for example, the IRQL values of a processor when running a thread is typically below DISPATCH_LEVEL (less than 2). Thus, thread switches cannot occur when a current IRQL for a processor is above DISPATCH_LEVEL (greater than 2). Such higher levels typically correspond to execution related to hardware components of a system.

The prioritizing of when a thread switch can occur is described above with reference to processors adapted for running the Microsoft® Windows® operating system. Other processors may have similar mechanisms for deciding when a thread switch is appropriate.

ALTERNATIVES

Adapting an program (as described above) and a processor to deliberately cause thread switching to test for race condition errors is likely to slow down the processing speed of the program. Thus, there may not be sufficient time within a normal test period to discover all errors in a program that could cause race conditions. However, the methods and systems described above can be further adapted to cause deliberate thread switching at times when a race condition is more likely to occur.

For example, race conditions are more likely to occur when the interrupted thread accesses a memory location. Thus, the interrupt handler 335 can be adapted so that the thread switch function 342 is called only if the interrupted thread causes memory transactions. Furthermore, since race conditions are also more likely when memory locations are shared between threads, the thread switch function 324 may be called to switch between only those threads that share control of a memory location. One way to accomplish this is to cause thread switches when executing an instruction associated with a lock, which is typically used in conjunction with shared memory locations. Also, the interrupt handler 335 can be adapted to distinguish between non-stack memory and stack memory. Race conditions are more likely to occur when a thread accesses non-stack memory because stack memory cannot be shared between threads.

Furthermore, the interrupt handler 335 can be adapted to keep track of memory and the various transactions performed upon the memory locations. For example, if a current thread is performing a memory transaction related to a location that has been accessed by other threads then a thread switch while accessing such a memory location may be more desirable. A unique thread ID number associated with each thread is used to keep track of which thread accessed which memory.

Also, various sections of the code can be tracked to see if the threads have been switched before while executing that part of the code. If numerous such thread switches have taken place then the testing may be moved to other parts of the code.

Once a thread that is more likely to cause race conditions when switched to other threads is identified, then that thread may be interrupted and switched repeatedly each time it is rescheduled by the operating system. Thus, the probability of discovering errors that could cause race conditions can be increased. This also likely to reduce the time related to conducting a more complete test for race conditions.

In view of the many possible embodiments, it will be recognized that the illustrated embodiments include only examples and should not be taken as a limitation on the scope of the invention. Rather, the invention is defined by the following claims. We therefore claim as the invention all such embodiments that come within the scope of these claims.

We claim:

1. A method for inducing thread switches during execution of a program being tested for race conditions at intervals other than thread intervals normally scheduled by an operating system, the method comprising:
   selecting an interval after which to trigger an interrupt on a processor executing the program;
   causing an interrupt at the end of the interval; and
   upon interrupt, inquiring whether a current thread being executed belongs to the program being tested, and if so, then causing the processor to prematurely switch from executing the current thread being executed to executing another thread ready to be executed.

2. The method of claim 1, wherein the interrupt is caused by a performance counter set to overflow at the end of the selected interval.

3. The method of claim 1, wherein the selected interval is related to clock cycles of the processor.

4. The method of claim 1, wherein the selected interval is related to one or more of the following events related to the processor:
   memory transactions;
   branch transactions; and
   bus transactions.

5. The method of claim 1, wherein the interval is selected using a random number generator.

6. The method of claim 1, wherein the interval is selected with user input.

7. The method of claim 1, wherein the thread switch is caused upon one or more of the following conditions being met:
   the processor executing an instruction associated with a lock;
   the processor executing memory transactions related to non-stacked memory;
   the processors executing areas of code rarely executed; and
   the processor executing memory transactions related to a memory element shared between threads.

8. The method of claim 1 further comprising, adapting an Interrupt Descriptor Table related to the processor to have a pointer to an interrupt handler function which causes the processor to prematurely switch from executing the current thread being executed to executing the another thread ready to be executed.

9. The method of claim 8 further comprising, adapting the program to have a thread switch function to be called upon interrupt by the interrupt handler function for causing the processor to prematurely switch execution of threads.

10. The method of claim 9, wherein the thread switch function is one or more of the following:
    a function that blocks execution of the current thread for a specified time;
    a function that causes the processor to yield execution to the another thread ready for execution; and
    a function that suspends execution of the current thread and causes the operating system to yield time allocated for execution of the current thread to the another thread ready for execution.

11. A computer-readable medium having computer-executable instructions for performing the method recited in claim 1.

12. A method for testing a test program for race condition errors comprising:
    using a device driver to induce an interrupt on a processor at a selected interval; and
    upon interrupt, if a current thread is associated with the test program, then causing the processor to yield time scheduled for processing the current thread to another thread ready for processing, wherein the selected interval is not the same as a thread interval scheduled for the current thread by a operating system associated with the program being tested.

13. The method of claim 12, wherein yielding the scheduled time of the current thread results in an abnormal number of thread switches.

14. A computer-readable medium having computer-executable instructions for performing the method recited in claim 12.

15. A method for prematurely inducing thread switches to test a program for race condition errors comprising:
    adapting the program for testing by inserting a thread switch function;
    adapting a processor by presetting a performance counter to overflow upon reaching a selected condition;
    adding an entry to an interrupt descriptor table related to the processor to serve as a pointer to an interrupt handler function adapted to call the thread switch function;
    causing an interrupt to the processor upon overflow of the performance counter;
    upon interrupt, retrieving the pointer to the interrupt handler function to call the interrupt handler function; and
    following instructions related to the interrupt handler function to call the thread switch function for causing a thread switch; wherein the selected condition is at least partially determined by a random number generator.

16. The method of claim 15, wherein the condition selected for causing the performance counter to overflow is related one or more of the following:
    clock cycles of the processor;
    memory transactions related to the processor;
    bus transactions related to the processor; and
    branch transactions related to the processor.

17. The method of claim 15, wherein the thread switch function is called upon one or more of the following conditions being met:
    the processor executing an instruction associated with a lock when interrupted;
    the processor executing memory transactions related to non-stacked memory when interrupted;
    the processors executing areas of code rarely executed; and
    the processor executing memory transactions related to a memory element shared between threads.

18. The method of claim 15 wherein the random number generator uses a Poisson distribution.

19. A system for testing a program for race conditions errors by causing premature thread switches comprising:
    a device driver operative to cause and respond to interrupts on a processor associated with the program;
    a performance counter associated with the processor that is adaptable to be programmed by the device driver to overflow upon reaching a selected condition; and an interrupt handler function operative for responding to interrupts by calling a thread switch function operative for causing the processor to prematurely switch from executing a current thread to another thread ready for processing;

wherein the interrupt handler function is called upon interrupt and resets the performance counter to overflow; and wherein the interrupt handler inquires whether the test program is being tested and if so, calls the thread switch function to cause the processor to switch threads.

20. The system of claim 19, wherein the device driver is adapted to cause the interrupts by selecting the condition upon which the performance counter overflows.

21. The system of claim 20, wherein the device driver receives instructions from a user.

22. The system of claim 19, wherein the interrupt handler function is adapted to inquire whether the following conditions have been met prior to calling the thread switch function:

was the processor executing an instruction associated with a lock when interrupted;

was the processor executing memory transactions related to non-stacked memory when interrupted;

was the processor executing areas of code rarely executed when interrupted; and was the processor executing memory transactions related to a memory element shared between threads when interrupted.

23. The system of claim 19, wherein the device driver is adapted to inquire whether the following conditions have been met prior to causing an interrupt:

is the processor executing an instruction associated with a lock;

is the processor executing memory transactions related to non-stacked memory;

is the processor executing areas of code rarely executed; and is the processor executing memory transactions related to a memory element shared between threads.

24. A system for inducing thread switches during execution of a program being tested for race conditions at intervals other than thread intervals normally scheduled by an operating system, the system comprising:

means for selecting an interval after which to trigger an interrupt on a processor executing the program;

means for causing an interrupt at the end of the interval; and means for operation upon interrupt, for inquiring whether a current thread being executed belongs to the program being tested, and means for operation upon the inquiry being true of whether the current thread being executed belongs to the program being tested, for causing the processor to prematurely switch from executing the current thread being executed to executing another thread ready to be executed.

* * * * *